(12) United States Patent
Schimmler et al.

(10) Patent No.: US 9,358,733 B2
(45) Date of Patent: Jun. 7, 2016

(54) METHOD AND A DEVICE FOR THE MANUFACTURE OF A FIBRE COMPOSITE COMPONENT, AND A FIBRE COMPOSITE COMPONENT

(75) Inventors: Marc Schimmler, Himmelpforten (DE); Bernd Raeckers, Bremen (DE); Thomas Kruse, Hermannsburg (DE); Wolfgang Schulze, Hasloh (DE)

(73) Assignee: Airbus Operations GmbH, Hamburg (DE)

( * ) Notice: Subject to any disclaimer, the term of this patent is extended or adjusted under 35 U.S.C. 154(b) by 128 days.

(21) Appl. No.: 14/111,662

(22) PCT Filed: Feb. 29, 2012

(86) PCT No.: PCT/EP2012/053470
§ 371 (c)(1),
(2), (4) Date: Oct. 14, 2013

(87) PCT Pub. No.: WO2012/139808
PCT Pub. Date: Oct. 18, 2012

(65) Prior Publication Data
US 2015/0004357 A1    Jan. 1, 2015

Related U.S. Application Data

(60) Provisional application No. 61/474,286, filed on Apr. 12, 2011.

(30) Foreign Application Priority Data

Apr. 12, 2011   (DE) .......................... 10 2011 007 235

(51) Int. Cl.
*B29C 70/54* (2006.01)
*B29C 70/48* (2006.01)
(Continued)

(52) U.S. Cl.
CPC .............. *B29C 70/545* (2013.01); *B29C 70/30* (2013.01); *B29C 70/48* (2013.01); *B29C 53/585* (2013.01);
(Continued)

(58) Field of Classification Search
CPC ...... B29C 70/545; B29C 70/48; B29C 70/30; B41C 1/061
See application file for complete search history.

(56) References Cited

U.S. PATENT DOCUMENTS

| 2,427,853 A | * | 9/1947 | Goodlett | ................... | B64C 3/00 |
| | | | | | 244/123.2 |
| 2,751,237 A | * | 6/1956 | Conley | ....................... | 285/133.4 |

(Continued)

FOREIGN PATENT DOCUMENTS

| DE | 1286741 | 1/1969 |
| DE | 102007004314 | 7/2008 |

(Continued)

OTHER PUBLICATIONS

Willden, K.S., et al., Advanced Technology Composite Fuselage—Manufacturing, NASA Contractor Report 4735, Apr. 1997, pp. 3-2 to 3-30.*

(Continued)

*Primary Examiner* — Matthew Daniels
(74) *Attorney, Agent, or Firm* — Greer, Burns & Crain Ltd.

(57) ABSTRACT

A method for the manufacture of a fiber composite component with at least one opening, which is edged by an integral collar, a device for the execution of a method of this type with a mold core, which has at least one convexity for the formation of a component section in the form of a bulge, also a fiber composite component with a multiplicity of openings, each of which is edged by an integral collar.

6 Claims, 2 Drawing Sheets

(51) Int. Cl.
  *B29C 70/30* (2006.01)
  *B29C 53/58* (2006.01)
  *B29K 105/08* (2006.01)
  *B29L 31/30* (2006.01)

(52) U.S. Cl.
  CPC ....... *B29C 53/587* (2013.01); *B29C 2793/0018* (2013.01); *B29K 2105/0872* (2013.01); *B29L 2031/3076* (2013.01); *Y02T 50/433* (2013.01); *Y10T 428/24273* (2015.01)

(56) References Cited

U.S. PATENT DOCUMENTS

| | | | | |
|---|---|---|---|---|
| 3,551,237 | A * | 12/1970 | Cox | B29C 53/564 156/155 |
| 4,118,262 | A * | 10/1978 | Abbott | B29C 53/60 138/129 |
| 4,263,249 | A | 4/1981 | Mayumi et al. | |
| 4,512,836 | A * | 4/1985 | Tucci | 156/174 |
| 5,204,033 | A | 4/1993 | Pearce et al. | 264/136 |
| 5,271,986 | A * | 12/1993 | Dublinski | B29C 33/307 428/156 |
| 5,397,272 | A * | 3/1995 | Smiley | F16C 3/026 138/109 |
| 6,114,012 | A | 9/2000 | Amaoka et al. | |
| 6,884,379 | B1 * | 4/2005 | Duqueine | B29C 43/003 264/258 |
| 7,935,290 | B2 * | 5/2011 | Cano Cediel | B29C 51/12 264/258 |
| 2002/0195524 | A1 | 12/2002 | Amaoka et al. | |
| 2007/0135245 | A1 | 6/2007 | Gazzara et al. | |
| 2009/0020217 | A1 * | 1/2009 | Cano Cediel | B29C 51/12 156/219 |
| 2009/0314892 | A1 * | 12/2009 | Kunichi | B21J 15/14 244/123.1 |
| 2010/0044508 | A1 * | 2/2010 | Pancotti et al. | 244/118.1 |
| 2010/0252182 | A1 * | 10/2010 | Rettig | 156/189 |
| 2011/0195807 | A1 | 8/2011 | Gazzara et al. | |

FOREIGN PATENT DOCUMENTS

| | | |
|---|---|---|
| DE | 102007054645 | 5/2009 |
| EP | 0007201 | 1/1980 |
| EP | 1134069 | 9/2001 |
| EP | 1797928 | 6/2007 |
| FR | 2633213 | 12/1989 |
| WO | WO2009062749 * | 5/2009 |

OTHER PUBLICATIONS

German Search Report, Nov. 14, 2011.
International Search Report, Jun. 6, 2012.
Computer-Aided Design and Manufacturing, Olivier Guillermin, 2001.

* cited by examiner

METHOD AND A DEVICE FOR THE MANUFACTURE OF A FIBRE COMPOSITE COMPONENT, AND A FIBRE COMPOSITE COMPONENT

CROSS-REFERENCES TO RELATED APPLICATIONS

This application claims the benefit of the U.S. Provisional Application No. 61/474,286, filed on Apr. 12, 2011, and of the German patent application No. 10 2011 007 235.7 filed on Apr. 12, 2011, the entire disclosures of which are incorporated herein by way of reference.

BACKGROUND OF THE INVENTION

The invention concerns a method and a device for the manufacture of a fibre composite component, and also a fibre composite component.

Conventionally, structural components in aircraft such as frames are manufactured in a metallic form of construction. What is advantageous in the metallic form of construction is the very good processability of the metallic materials. What is disadvantageous, however, in their relatively high weight. In recent times structural components have therefore been manufactured to an increasing extent in a fibre composite form of construction, which components essentially have a resin matrix, in which carbon fibres, glass fibres, aramide fibres, and similar are embedded. The manufacture of the structural components such as frames is undertaken thereby as a rule from layers of fibres pre-impregnated with a resin (pre-pregs) or in a fibre placement technology such as AFP (Advanced Fibre Placement). However, it is relatively difficult to position the fibres in their optimal direction. Moreover the pre-pregs have a tendency, for example, when they are being draped, to displacements in the layered structure, and thus to distortions such as folds. As a consequence such frames do not have an ideal structure from the structural mechanics point of view; this leads to a disadvantageous increase in the structural weight of the aircraft. Moreover, the fibre composite form of construction of known art, in contrast to the metallic form of construction, does not offer the possibility of introducing flanged or flange-form holes into the structural components. Such holes, however, by virtue of their surrounding collar, in the case of frames for example, significantly reduce any bulging in the web. In addition, in aircraft the openings simplify the installation of systems, and lead to a weight reduction of the structural components.

From DE 10 2007 054 645 A1 it is of known art to manufacture aircraft frames using winding technology. Here, dry continuous fibres are wound around a three-dimensional mould core, the outer contour of which, at least in some sections, forms the contour of the fibre composite component to be manufactured. However, even this method in the version described does not allow the formation of flange-form holes.

SUMMARY OF THE INVENTION

The object of the invention is to create a method for the manufacture of a fibre composite component, which removes the disadvantages cited above and allows the formation of flange-form holes. Likewise it is the object of the invention to create a device for the execution of this method, and also a fibre component with flange-form holes.

In an inventive method for the manufacture of at least one fibre composite component a mould core is firstly prepared with at least one convexity. Fibre material is then positioned on the mould core to form a body of material, wherein in the region of the convexity a bulge-form body section is formed. The body of material is then cured and removed from the mould. Thereafter the bulge-form body section is opened to form a hole while allowing an integral collar surrounding the hole to remain in position.

In the inventive method it is particularly advantageous that the at least one hole is surrounded by an integral collar, as a result of which the hole with the collar has the geometry of a flanged metal opening, and the stability of the component is significantly increased. Moreover the fibre material is placed directly in position on a three-dimensional body, so that subsequent draping tasks, such as occur in a fibre placement technology in a plane, are dispensed with, and no displacements of the fibre material or distortions can occur.

In a preferred example of embodiment a symmetrical mould core is prepared with a multiplicity of convexities on side faces of the mould core that are facing away from one another. The fibre material is then arranged on the mould core to form a preform, wherein in the region of each of the convexities a bulge-form body section is formed. The preform is then impregnated with a resin. The preform is then cured. After that the cured preform is removed from the mould by parting in the plane of symmetry of the mould core into two fibre composite components. Finally the bulge-form body sections are opened to form holes while in each case allowing an integral collar surrounding the hole to remain in position. In this example of embodiment it is advantageous that two fibre composite components are simultaneously formed through the manufacture of one preform, as a result of which the production effort is significantly reduced. Furthermore the individual fibres, dry or just provided with a binder, during placement can be arranged close-to-contour on the mould core.

The fibre material can be arranged in multiple layers on the mould core, wherein fibre structures with a separate fibre orientation can be placed in position in regions between the individual layers. By this means the individual regions of the fibre composite component can have a distinct prevailing fibre orientation that is thus optimally matched to the respective loading, as a result of which the stability and load capability of the fibre composite components is improved, and the fibre composite component can moreover be embodied with minimal wall thicknesses and thus in a weight-optimised manner.

In one example of embodiment at least some of the bulge-form body sections after the arrangement of the fibre material are reshaped in an opposite direction. If, for example, the bulge-form body sections are orientated outwards, then before the introduction of resin, or at the latest, before the curing process, they are reshaped inwards. By this means the fibre composite components can be designed with a plane outer side face, which simplifies their location and installation.

In one example of embodiment continuous fibres form the fibre material, which fibres are braided around the mould core. The braiding technology allows the manufacture of fibre composite components with almost any geometry and enables the formation of close-to-contour preforms that can be subjected to high loads.

In another example of embodiment the continuous fibres are wound onto the core. Compared with braiding technology, winding technology requires less complex machinery, but also enables the manufacture of fibre composite components with almost any geometry and the formation of close-to-contour preforms that can withstand loads.

A device in accordance with the invention for executing a method as described above has a mould core that has a multiplicity of convexities, and a placement unit for the arrangement of the fibre material on the mould core.

Such a device allows the manufacture of fibre composite components with bulge-form component sections, which after an opening can form holes with a surrounding integral collar, so that the fibre composite components have flanged holes of quasi-known art from metallic structures.

In one preferred example of embodiment the mould core is designed with mirror symmetry about a plane; this allows the simultaneous manufacture of two fibre composite components of the same type.

In one example of embodiment the mould core has variable-shape core sections in the region of the convexities. The variable-shape core sections can for example be formed from two pads or bags that can be inflated, which when subjected to an internal pressure have a fixed contour with a convex surface, and in the depressurised state can be collapsed together, and then form a concave surface, so that the bulge-form body sections of the respective fibre composite component can be designed directed both inwards and also outwards.

In order to enable a close-to-contour profile of the fibre material in the region of the convexities, the device can have a pressure application unit for purposes of applying pressure to the fibre material, at least in the region of the convexities. As an alternative or in addition to the pressure application device, appropriately configured pressure plates can also be provided for an infusion/curing cycle; these encompass the convexities in an annular shape. However, since the fibre material is subject to hardly any elongation, care is to be taken during the placement of the fibre material that lengths are equalised so as to prevent any tearing of the fibre material and thus any crack in the preform when placing the pressure plates in position.

An inventive fibre composite component has a multiplicity of holes, each of which is edged with an integral collar.

By virtue of the flange-form holes such a fibre composite component has a high resistance to local effects such as bulging or buckling. Likewise, the holes can provide good structural options for the feedthrough of systems during their installation.

For purposes of optimising the structural mechanical properties the fibre composite component can have regions with a preferred fibre orientation.

In one preferred example of embodiment the fibre composite component is designed as a C-shaped profile with two flanges and a web connecting the flanges, wherein in the region of the flanges a 0°-fibre orientation predominates in the longitudinal direction of the fibre composite component, and in the web region a ±45°-fibre orientation to the longitudinal direction of the fibre composite component is specified.

Additionally or alternatively, at least one textile reinforcement element extending in the longitudinal direction can be arranged in the web region. The reinforcement element preferably has a 0°-fibre orientation in the longitudinal direction of the fibre composite component. The reinforcement element can be arranged as a dry preform that is still to be impregnated with resin, in the fibre composite component preform, or on the mould core. Alternatively it can be built up layer-by-layer by the placement of fibre material in the fibre composite component preform. Furthermore, the reinforcement element can also be an element that is already prefabricated, such as a pulltrusion profile, which is sewn or integrated into the preform. The embodiment of the reinforcement element as a pulltrusion profile can, for example, be advantageous in the case of components with a straight profile such as floor beams, since pulltrusion profiles with a straight profile are quick and reliable to manufacture with a high level of quality in production technology terms.

One preferred fibre composite component is an aircraft frame, in the web of which holes are formed with integral collars. Another preferred fibre composite component is a floor beam.

Further advantageous examples of embodiment of the invention are the subjects of further subsidiary claims.

BRIEF DESCRIPTION OF THE DRAWINGS

In what follows preferred examples of embodiment of the invention are elucidated in more detail with the aid of highly simplified schematic representations. Here.

DETAILED DESCRIPTION OF THE PREFERRED EMBODIMENTS

In the figures the same design elements bear the same reference numbers. However, in the interests of clarity in the case of a plurality of the same elements in the figures just some of the elements are provided with a reference symbol. In addition, it should be mentioned that in the description fibre orientations are always cited with reference to the longitudinal axis of the fibre composite component that is being manufactured.

Figure 1:
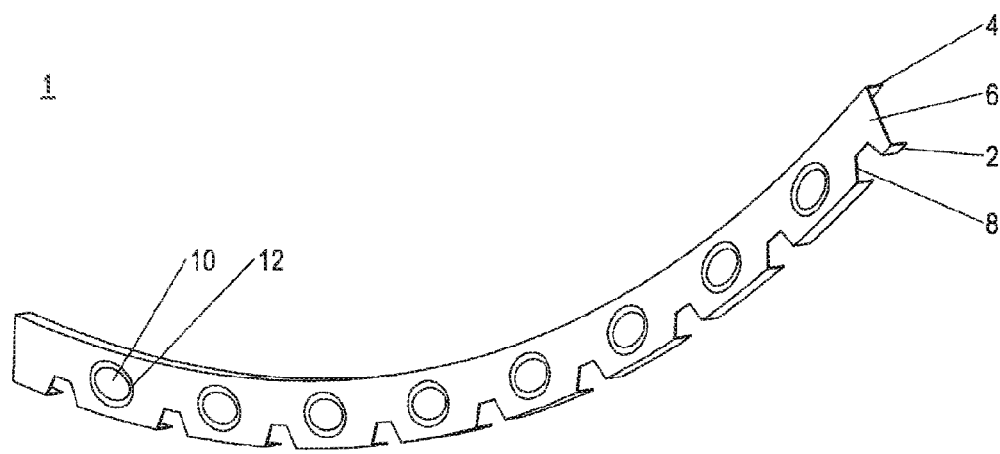
FIG. 1 shows a perspective representation of a first example of embodiment of an inventive fibre composite component.

FIG. 1 shows a side view of an inventive fibre composite component 1 in perspective. The fibre composite component 1 is embodied as a transverse frame or frame, for the purpose of stiffening, for example, individual fuselage shells of an aircraft fuselage. On its end faces it is joined with adjacent frames to form a closed ring and thus serves the purpose of stiffening the aircraft fuselage per se. The frame 1 preferably consists of continuous braided fibres, which are embedded in a thermosetting or thermoplastic resin matrix. Alternatively, the continuous fibres can also be wound.

Examples of such continuous fibres are carbon fibres, glass fibres, aramide fibres and similar.

The frame 1 has a C-shaped profile with an outer flange 2, an inner flange 4, and a web 6. The outer flange 2 serves the purpose of connecting the frame 1 to the fuselage shell. For the purpose of bridging longitudinal stiffeners such as stringers (not shown) arranged on the fuselage shell the outer flange 2 is penetrated by a multiplicity of cut-outs 8 extending into the web 6, through which the stringers are led. The inner flange 4 preferably has a predominant fibre orientation of 0°.

The inner flange 4 serves the purpose of stabilising the frame 1. It is orientated in the same direction as the outer flange 2 and has the same configuration. In accordance with the representation in FIG. 1 the flanges 2, 4 are essentially directed into the plane of the sheet, i.e. are orientated inwards. The inner flange 4 preferably also has a preferred fibre orientation of 0°.

The web 6 connects the outer flange 2 with the inner flange 4 and forms the so-called shear panel. It has a predominant fibre orientation of ±45° and has a multiplicity of holes 10, which in the vertical direction of the frame 1 are arranged displaced between the cut-outs 8. Each of the holes 10 has an elliptical cross-section and is edged with an integral collar 12. Needless to say, the holes 10 can also have other cross sections. In the example of embodiment shown the collars 12 are orientated in the opposite direction to the flanges 2, 4, and thus in accordance with the representation in FIG. 1 point out of the plane of the sheet, i.e. outwards. For purposes of intercepting raised stresses introduced into the web 6 as a result of the cut-outs 8, a reinforcement element 14 extending in the longitudinal direction of the frame 1 (see FIG. 4) is arranged between the recesses 8 and the holes 10. The reinforcement element 14 consists of a fibre product and has a 0°-fibre orientation.

Figure 2:
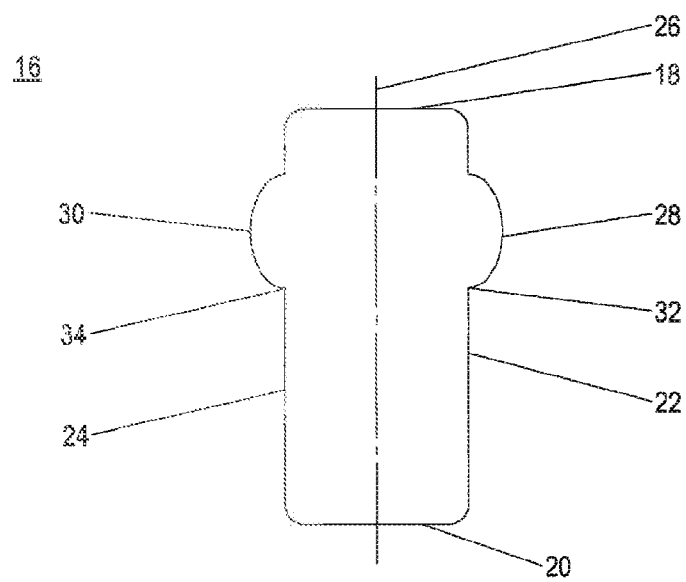
FIG. 2 shows a cross-section through an inventive mould core for the manufacture of the fibre composite component.
Figure 3:
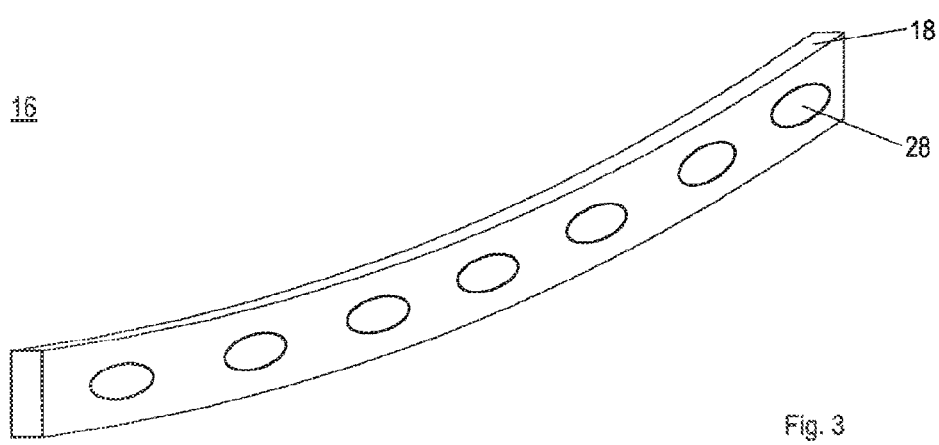
FIG. 3 shows a representation of the mould core in perspective.

The manufacture of the frame 1 is undertaken by means of a device, which has a single-piece mould core 16 shown in FIGS. 2 and 3. The mould core 16 can, however, also be embodied in multiple pieces. It has an elongated extent tracing the contour of the frame 1 with what is in principle a rectangular cross-section. It is of curved design in the longitudinal direction and in accordance with the representation in FIG. 2 has a narrow upper face 18, an opposing narrow lower face 20, a right side face 22, and also an opposing left side face 24. It is designed with mirror symmetry about its vertical plane 26 and in the region of its side faces 22, 24 has a multiplicity of convexities 28, 30, each with an elliptical cross-section. The mould core allows the simultaneous manufacture of two frames 1, 1' (see FIG. 5), wherein its narrow faces 18, 20 determine the contour of the flanges 2, 4 and its side faces 22, 24 determine the contour of the respective web 6. The convexities 28, 30 serve to provide the preparatory form of the holes 10, and in particular of the integral collars 12, as will be described in more detail in what follows.

Moreover, the device has a braiding unit, not shown, for purposes of arranging the continuous fibres on the mould core 16. Alternatively, the device can also have a winding unit. Furthermore, the device preferably has a pressure application unit assisting the braiding or winding unit for purposes of close-to-contour guidance of the continuous fibres over the mould core 16, in particular in transition regions 32, 34 between the convexities 28, 30, and the plane sections of the side faces 22, 24 surrounding the convexities 28, 30. As an alternative or in addition to the pressure application unit the device has annular pressure plates, which surround the convexities 28, 30, during an infusion or injection process, and enable a close-to-contour guidance of the continuous fibres over the mould core 16. Furthermore, the device has a cutting unit, not shown, with a miller, a water jet nozzle, a laser, and similar as a cutting head for purposes of opening the holes 10.

Figure 4:
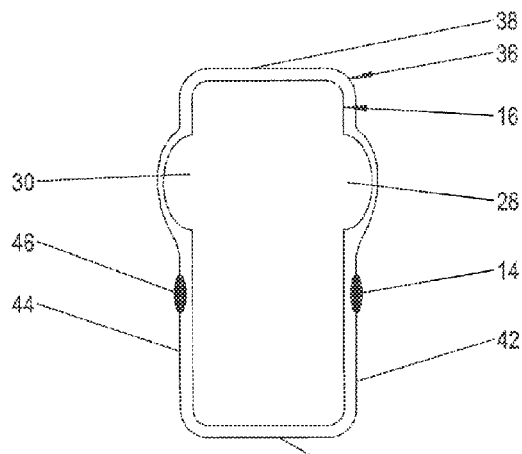
FIGS. 4, 5 and 6 show steps in the method for the manufacture of the fibre composite component.

In an inventive method for the manufacture of the frame 1 as shown in FIG. 1 with two inwardly directed flanges 2, 4 and a multiplicity of web-side holes 10, which are edged by integral collars 12 pointing outwards, a mould core 16 is firstly prepared with convexities 28, 30. Then as shown in FIG. 4 a preform 36 with a peripherally closed wall is built up onto the mould core 16 by means of braiding technology. The preform 36 consists of dry continuous fibres, preferably provided with a thermoplastic binder, and in accordance with the representation has an upper wall section 38, an opposed lower wall section 40, a right-hand side wall section 42 and also an opposed left-hand side wall section 44. The mould core 16 is braided in multiple layers, wherein in the region of the side wall sections 43, 44 a fibre orientation of ±45° is preferably set. In the region of the upper wall section 38 and the lower wall section 40 single layer or multilayer fibre structures, not shown, are laid in position, preferably with a 0°-fibre orientation, so that in these wall sections 38, 40 a 0°-fibre orientation predominates. The continuous fibres are guided close-to-contour over the mould core 16 and for purposes of precise transfer of the shape of the convexities 28, 30 onto the side wall sections 42, 44 of the preform 36 can be pressed against the mould core 16 in the region of the convexities 28, 30 by means of the pressure application unit. In accordance with the representation in FIG. 4 the reinforcement elements 14, 46 are integrated into the side wall sections 40, 42 underneath the convexities 28, 30 in the preform 36, for example by the application of single layers of appropriate strip-form fibre structures. The reinforcement elements 14, 46 are preferably aligned with a 0°-fibre orientation.

After the build up of the preform 36 the latter is impregnated in a resin injection method such as RTM (Resin Transfer Moulding) or a resin infusion method such as VARI (Vacuum Assisted Resin Infusion) with an appropriate resin material such as an epoxy resin, wherein the annular pressure plates are preferably arranged in the region of the convexities 28, 30. Then follows the curing and consolidation of the preform 36.

Figure 5:
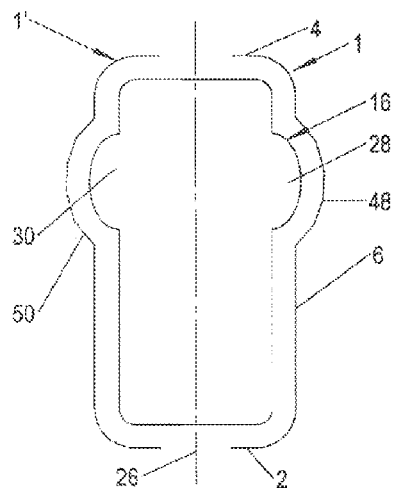

After the curing and consolidation of the preform 36 the latter is removed from the mould. For this purpose the cured preform 36 as shown in FIG. 5 is parted in the vertical plane 26 of the mould core 16, and thus in the region of its upper wall section 38 and its lower wall section 40, into two equal fibre composite components 1, 1', which in each case represent a C-shaped frame with an outer flange 2, an inner flange 4, and a web 6. Here the webs 6 in the region of the convexities 28, 30 of the mould core 16 have a multiplicity of bulge-form body sections 48, 50 tracing the convexities 28, 30. Accordingly the bulge-form body sections 48, 50 have in each case an elliptical cross-section and are orientated in an opposite manner to the flanges 2, 4, i.e. outwards.

Figure 6:
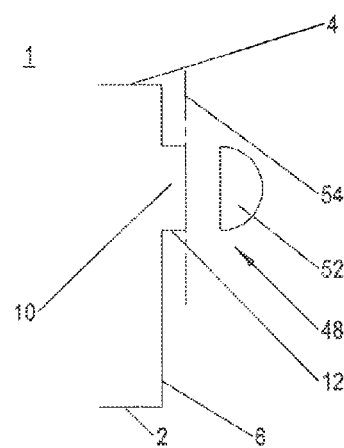

After the removal from the mould the holes 10 with the integral collars 12 are formed in the frames 1, 1'. For this purpose, as shown in FIG. 6 for one frame 1, the bulge-form body sections 48 are opened, using the cutting unit, by the removal of their dome-form shell sections 52 in the region of a parting plane 54 such that in each case a collar 12 remains in position, pointing away from the web 6. The angular orientation of the collar 12 relative to the web 6, and also the cross-sections of the holes 10, are prescribed by the shape of the convexities 28, 30.

After the formation of the openings 10 the frames 1, 1' are forwarded to a finishing station, in which the cut-outs 8 are formed by means of a mechanical process.

Figure 7:
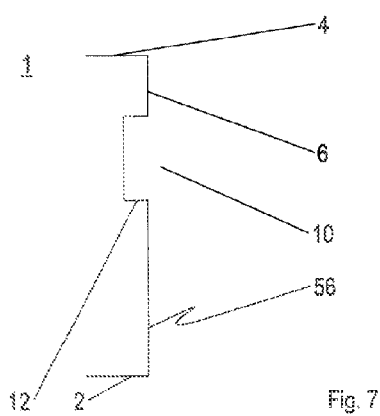
FIG. 7 shows a cross-section through a second example of embodiment of an inventive fibre composite component.

In FIG. 7 an alternative fibre composite component 1 is shown, designed as a frame with a C-profile. In contrast to the example of embodiment shown in FIG. 1 this frame 1 has a multiplicity of web-side integral collars 12, which are orientated in the same direction as its flanges 2, 4 and are thus directed inwards. By this means a plane web-side outer face 56 is generated, which, for example, simplifies the assembly of the frames 1 with fittings of known art.

Figure 8:
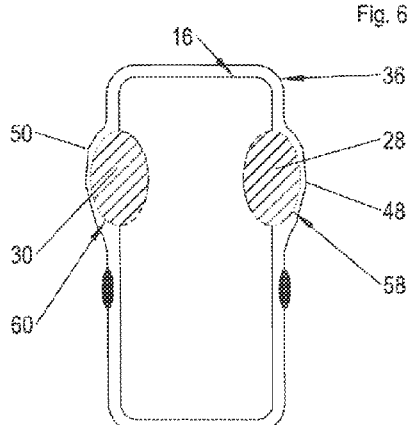
FIG. 8 shows steps in the method for the manufacture of the fibre composite component from FIG. 7 using an alternative mould core.

For the formation of the inwardly pointing integral collars 12 a mould core 16 as shown in FIG. 8 is used. The mould core 16 has for the formation of the convexities 28, 30 a multiplicity of variable-shape core sections 58, 60, formed by a bag or pad, and represented in a cross-hatched manner. For the formation of the inwardly-directed collars 12 the variable-shape core sections 58, 60 are subjected to high pressure, for example by the introduction of a fluid such as air, and shape-stabilised. By virtue of their subjection to high pressure the convexities 28, 30 are directed outwards and have a convex surface forming the bulge-form body sections 48, 50 of the preform 36.

After the formation of the preform 36 the core sections 58, 60 are depressurised and lose their shape stability. The bulge-form body sections 48, 50 of the preform 36 are pressed inwards, as a result of which the convexities 28 now have a concave surface, indicated by a dashed line, and reproducing the final contour of the bulge-form body sections 48, 50.

After the reshaping of the bulge-form body sections 48, 50 the preform 36, in a manner corresponding to the first example of embodiment, is impregnated with a resin, cured, consolidated and removed from the mould.

After the removal from the mould and thus after the parting of the cured and consolidated preform 36 into two fibre composite components 1, 1' the holes 10 with the now inwardly-pointing collars 12 are formed by appropriate parting or opening of the bulge-form body sections 48, 50. The frames 1, 1' are then, as explained above for the first example of embodiment, forwarded to a finishing station for the formation of the cut-outs 8.

Disclosed is a method for the manufacture of a fibre composite component with at least one opening, which is edged by an integral collar, a device for the execution of a method of this type with a mould core, which has at least one convexity for the formation of a component section in the form of a bulge, also a fibre composite component with a multiplicity of openings, each of which is edged by an integral collar.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

REFERENCE SYMBOL LIST 1, 1' Fibre composite component
2 Outer flange
4 Inner flange
6 Web
8 Cut-out
10 Opening
12 Collar
14 Reinforcement element
16 Mould core
18 Narrow face
20 Narrow face
22 Side face
24 Side face
26 Vertical plane
28 Convexity
30 Convexity
32 Transition region
34 Transition region
36 Preform
38 Wall section
40 Wall section
42 Side wall section
44 Side wall section
46 Reinforcement element
48 Body section
50 Body section
52 Shell section
54 Parting plane
56 Outer face
58 Variable-shape core section
60 Variable-shape core section

The invention claimed is:

1. A method for the manufacture of at least one fibre composite component, comprising the steps:
preparing a mould core with at least one convexity,
arranging fibre material on the mould core to form a body of material, wherein a bulge-form body section is formed in the region of the convexity,
impregnating the body of material with a resin,
curing the resin to form a cured body of material,
removing the cured body of material from the mould core,
opening the bulge-form body section after removing the cured body of material from the mould core such that a hole is formed, while allowing an integral collar surrounding the hole to remain in position.

2. The method in accordance with claim 1, wherein
the step of preparing a mould core comprises preparing a symmetrical mould core with a multiplicity of convexities, on side faces of the mould core that are facing away from one another,
the step of arranging fibre material on the mould core to form a body of material, comprises forming a bulge-form body section in the region of each of the convexities,
the step of removing the cured body of material from the mould core comprises parting the cured body of material in the plane of symmetry of the mould core into two fibre composite components, and opening the bulge-form body sections in each fiber composite component to form holes, whilst allowing integral collars surrounding the respective holes to remain in position.

3. The method in accordance with claim 1, wherein the fibre material is arranged in multiple layers on the mould core, and in regions between individual layers fibre structures with a separate fibre orientation are placed in position.

4. The method in accordance with claim 1, wherein after the arrangement of the fibre material at least one of the convexities is reshaped in a direction opposite of that in which the convexity extends.

5. The method in accordance with claim 1, wherein the step of arranging fibre material on the mold core comprises braiding continuous fibres around the mould core.

6. The method in accordance with claim 1, wherein the step of arranging fibre material on the mold core comprises winding continuous fibres around the mould core.

* * * * *